Jan. 5, 1971  W. W. MOSHER, JR., ET AL  3,551,963
SELF-LOCKING SNAP FASTENER
Filed Aug. 16, 1968  2 Sheets-Sheet 1
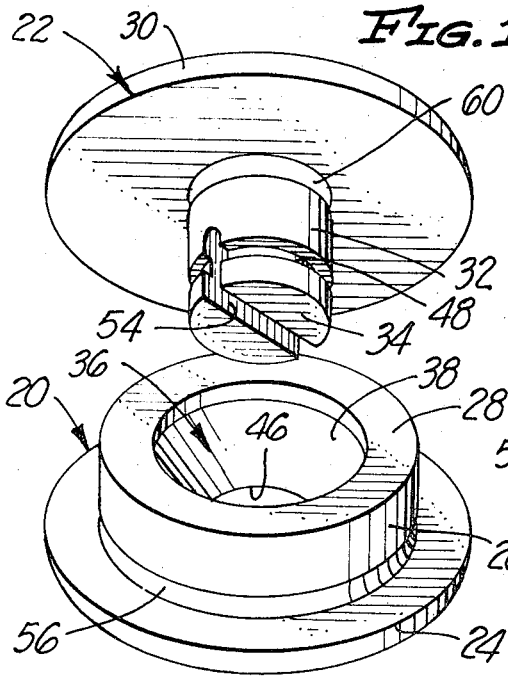
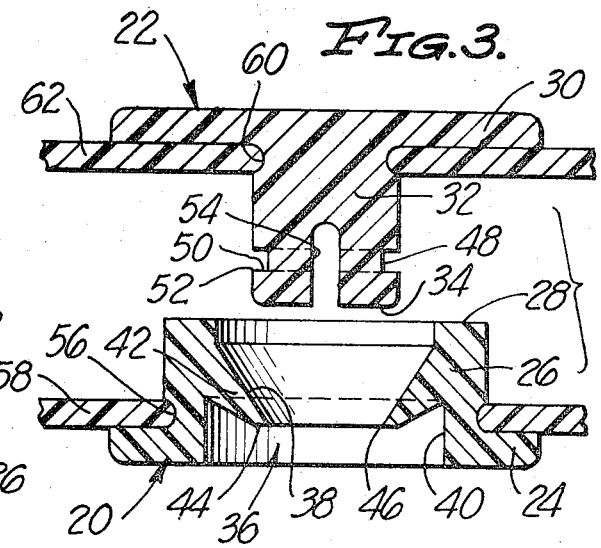
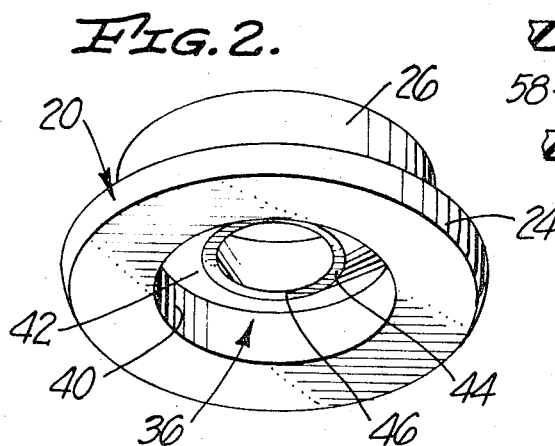
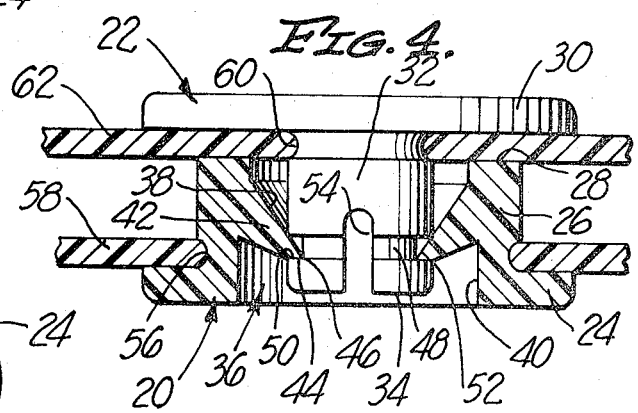
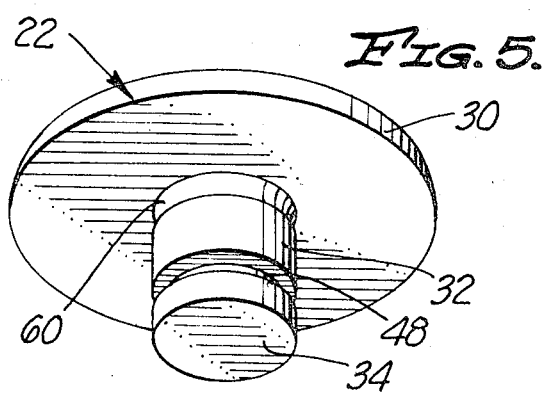
INVENTORS
WALTER W. MOSHER, JR.,
DONALD A. LONG
BY
MAHONEY, HORNBAKER
& SCHICK
ATTORNEYS Jan. 5, 1971     W. W. MOSHER, JR., ET AL     3,551,963
SELF-LOCKING SNAP FASTENER
Filed Aug. 16, 1968     2 Sheets-Sheet 2
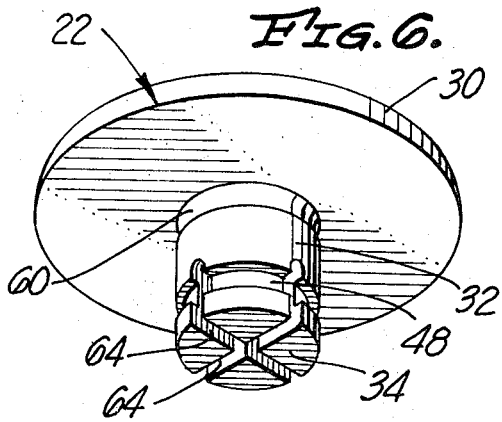
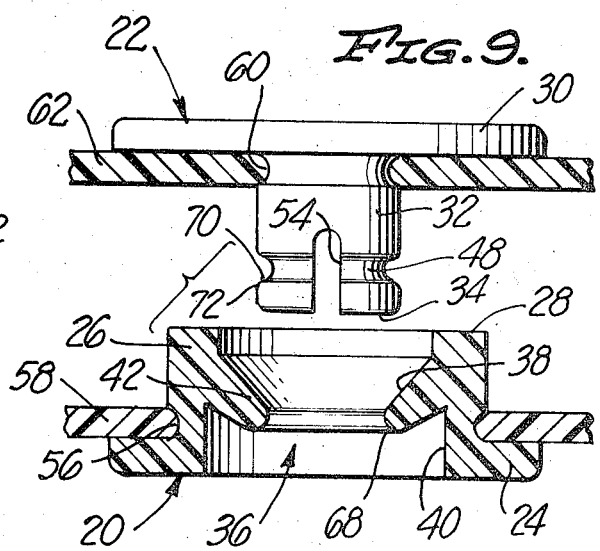
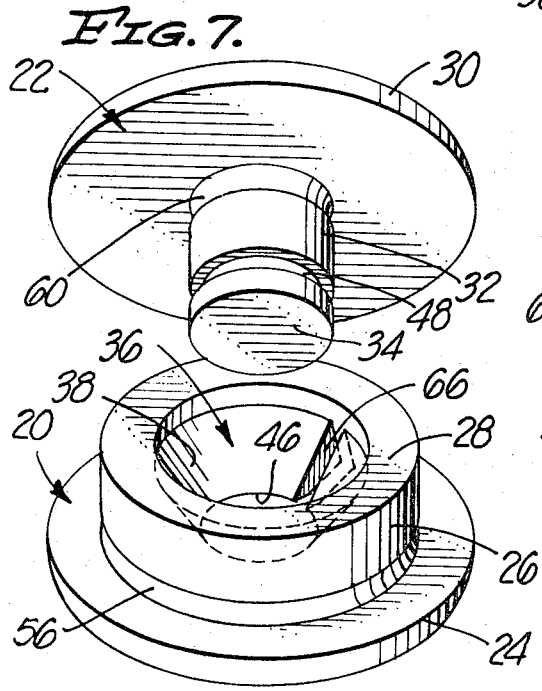
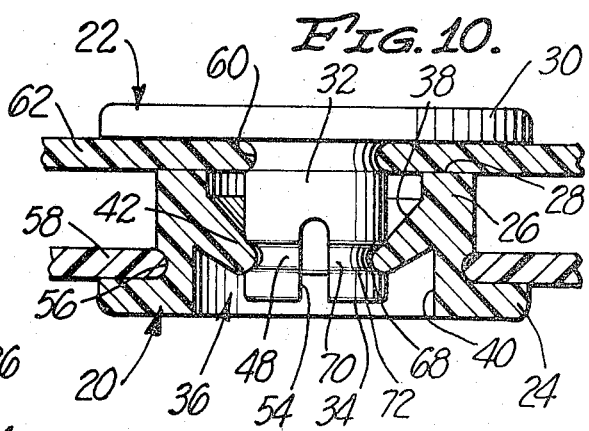
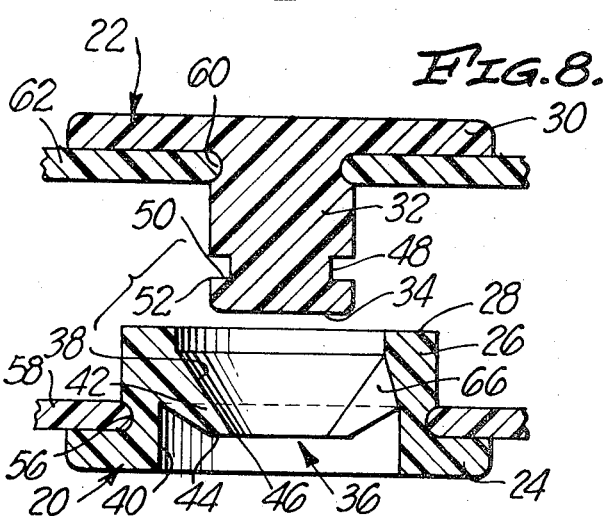
INVENTORS
WALTER W. MOSHER, JR.,
DONALD A. LONG
BY
MAHONEY, HORNBAKER
& SCHICK
ATTORNEYS

United States Patent Office 3,551,963
Patented Jan. 5, 1971

3,551,963
SELF-LOCKING SNAP FASTENER
Walter W. Mosher, Jr., 738 Fairmont 91501, and Donald A. Long, 936 Uclan Drive 91504, both of Burbank, Calif.
Filed Aug. 16, 1968, Ser. No. 753,136
Int. Cl. A44b 17/00
U.S. Cl. 24—216
4 Claims

ABSTRACT OF THE DISCLOSURE

A female component is formed by a headed shank having an axial opening therethrough and an opening restricting annulus projecting into said opening angling in an axial direction away from a shank free end. The annulus tapers inwardly and terminates inwardly in either a flat radial portion axially opposite said shank free end or in an arcuate edge. A male component has a headed shank with an annular groove, said male component shank being received through the free end of the female component shank and into the female component shank opening. The female component annulus engages in the male component shank groove, the annulus flat portion engaging a flat side of the groove for permanent locking or the annulus arcuate edge engages an arcuate outer edge of the groove for selective release. Both components may be formed of a resiliently deformable plastic and the male component shank may be axially slotted or the female component annulus may be radially slotted to increase resilient deformation and facilitate assembly.

BACKGROUND OF THE INVENTION

This invention relates to a self-locking snap fastener which is particularly adapted for being made of virtually any size, including extremely small sizes, yet is inordinately positive in snap self-locking operation, far greater than has heretofore been possible with the prior fastener constructions. More particularly, this invention relates to a self-locking snap fastener having the foregoing positive operation which may be formed as a permanent locking fastener or a selectively releasable fastener, the choice between said alternate forms being made possible with only slight alteration, while in both forms retaining said positive operation feature. Furthermore, added to this feature of versatility is the fact that the various forms of the snap fastener may be economically produced where desired by ordinary injection molding processes from relatively common, resiliently deformable plastics, particularly advantageous in the production of self-locking snap fasteners of the extremely small sizes.

Various prior forms of fastener constructions have been formed in all sizes and shapes and from a multiplicity of materials. One such prior general form has been those fasteners which, although allegedly of the snap fastener type, have been of relatively simple configurations, but not truly positive in snap, self-locking operation. Such prior snap fasteners of these simple configurations require extremely high pressures to accomplish the fastening assembly thereof in an attempt to assure positive engagement, yet they must be very closely inspected after the assembly operation in order to assure that a proper fastening operation has been accomplished.

Where the prior fastener constructions have actually been of a positive, snap, self-locking nature, it has been necessary to design the same of quite complicated configurations which are excessively expensive to produce. These complicated configurations have usually required complex configurations of expensive spring metals which can only be produced by equally complex stamping die operations. Furthermore, these complex configurations have not been adapted to production from the cheaper, more easily and inexpensively molded plastics if the fasteners are to retain any satisfactory degree of positive operating qualities.

OBJECTS AND SUMMARY OF THE INVENTION

It is, therefore, an object of this invention to provide a self-locking snap fastener which is of relatively simple configuration, while having exact and positive snap, self-locking qualities, yet may be formed of virtually any size including extremely small sizes without affecting the positive, snap, self-locking attributes offered thereby. According to preferred embodiments of the present snap, self-locking fastener of the present invention, a female component has a frusto-conical opening portion formed therein so as to provide an inwardly tapered and angling, opening restricting anulus dimensioned for positive, somewhat angled engagement in an annular groove of a male component during assembly. The direction of angling of the female component annulus is in the same direction as that required for assembly of the two components, so that by forming at least one of the female component annulus or the male component groove area of a resilient material, positive, snap, self-locking engagement of the annulus within the groove takes place during assembly which angularly resists separation or tends to increase such engagement upon forces being applied to reversely disassemble the components.

It is a further object of this invention to provide a self-locking snap fastener having the foregoing positive, snap, self-locking qualities which, with relatively simple and slight alteration, may provide either virtually permanent locking with high resistance to component separation without partial destruction of one or the other of the components, or may provide selectively releasable engagement between the components, despite the original positive, snap, self-locking engagement. Where permanent locking is desirable, the female component annulus is formed terminating within the female component opening in relatively sharp edge, with the male component groove formed with equally sharp outer edges, and in addition, the female component annulus may have a flat portion engaging a flat side of the male component groove so as to give maximum resistance against axial movement between the components in an attempted separation thereof after assembly. This, thereby, results in a virtually permanent assembly once the original snap, self-locking assembly has been accomplished.

At the same time, however, merely with the slight alterations of forming an arcuate or rounded inner edge on the female component annulus, and also preferably a mating arcuate or rounded corner on the male component groove, said arcuate edge and corner abutting during assembly, the resiliency of the female component annulus or the male component in the area of the groove, permits selective separation of the components. Such separation is accomplished merely by applying an axial force of reasonable degree sufficient to deform either the female component annulus or the male component groove allowing the selected disengagement thereof. In view of the unique formation and cooperation between the female component annulus and the male component groove, such selective disengagement may take place without sacrificing original positive, snap, self-locking qualities of the fastener during the original engagement of the components and during engaged use thereof.

It is still a further object of this invention to provide a self-locking snap fastener having all of the foregoing advantageous and useful features which is adapted for relatively inexpensive fabrication from virtually any of the usual plastic or metal materials. With the unique, yet simple, configurations of the fastener components, the choice of material for fabrication will only affect the positive fastening qualities to predicted degrees and precisely as desired. Thus, with the fastener of the present invention, the final positive, snap, self-locking qualities of a particular fastener construction may be very precisely predicted at the time of fabrication, whether the fastener is of the permanent locking or selectively releasably type, giving maximum versatility in design.

For instance, the snap, self-locking qualities of the fastener may be predictably varied by increasing or decreasing the resilience and deformability of the female component annulus and the male component in the area of the annulus engaging groove, since resilience and deformability in these areas, as well as the angling of the female component annulus, will determine the ultimate snap, self-locking qualities. The resilence and deformability of the female component annulus may be increased by radially slotting the same, or the resilience and deformability of the male component may be increased by various forms of axial slotting thereof, all providing predictable results. Also, the previously discussed relatively sharp edge and corner with axially abutting flats of the components, or the arcuate mating edge and corner of the components, may be varied to predictably vary the permanent or selectively releasable features of the fastener of the present invention.

Other objects and advantages of the invention will be apparent from the following specification and the accompanying drawings which are for the purpose of illustration only.

BRIEF DESCRIPTION OF THE DRAWINGS

FIG. 1 is a perspective view of an embodiment of fastener incorporating the principles of the present invention, illustrating the fastener components separated and prior to assembly thereof;

FIG. 2 is a perspective view of the female fastener component of the fastener of FIG. 1 showing further details of construction thereof;

FIG. 3 is a fragmentary, axial sectional view of the fastener components of FIG. 1 prior to assembly and illustrating the fastener components engaged with overlying material sheets to be fastened;

FIG. 4 is a view similar to FIG. 3 but with the fastener components assembled and with the male fastener component shown in elevation;

FIG. 5 is a perspective view of a further embodiment of male fastener component usable in the fastener assembly of FIG. 4;

FIG. 6 is a perspective view of a still further embodiment of male fastener component usable in the fastener assembly of FIG. 4;

FIG. 7 is a view similar to FIG. 1 illustrating still an additional embodiment of fastener construction prior to assembly of the components thereof;

FIG. 8 is a fragmentary, axial sectional view of the embodiment of fastener of FIG. 7 illustrating the components prior to assembly and engaged with overlying material sheets to be fastened;

FIG. 9 is a view similar to FIG. 8 but illustrating a still further embodiment of fastener and with the male component thereof shown in elevation to better illustrate certain details of construction thereof; and FIG. 10 is a view similar to FIG. 9 and illustrating the embodiment of fastener of FIG. 9 with the components thereof assembled.

DESCRIPTION OF THE BEST EMBODIMENTS CONTEMPLATED

Referring to FIGS. 1 through 4 of the drawings, an embodiment of fastener incorporating certain of the principles of the present invention is illustrated, being of the permanent locking type and including a female fastener component generally indicated at 20 and a male fastener component generally indicated at 22. The female fastener component 20 has an enlarged, radially extending head 24 and a preferably integral, axially projecting, preferably generally cylindrical shank 26 terminating axially in a free end 28. The male fastener component 22 has a similar enlarged, radially extending head 30 and a preferably integral, axially projecting, preferably generally cylindrical shank 32 terminating in a free end 34, the male component shank being of reduced radial dimensions from the female component shank 26.

The female fastener component 20 further includes an axially extending, preferably through opening 36 having a frusto-conical opening portion 38 from the shank free end 28 axially toward the head 24 and terminating axially in an enlarged, preferably cylindrical, annular recess portion 40 extending axially preferably through the head 24. The female component opening frusto-conical and annular recess portions 38 and 40 thereby combine to form a generally radially inwardly projecting and opening restricting annulus 42 which tapers radially inwardly with progressively axially diminishing dimensions and is angled radially inwardly and axially away from or opposite the shank free end 28. The side of the annulus 42 axially toward the opening annular recess portion 40 also preferably angles radially inwardly and axially away from or opposite the shank free end 28 so as to form the annulus 42 over-all angling radially inwardly and axially away from or opposite said shank free end, the annulus terminating radially inwardly axially spaced from the termination of the opening 36 preferably in a relatively flat, radially extending portion 44 facing axially away from or opposite the shank free end 28 and forming a relatively sharp annulus inner terminal end 46.

The shank 32 of the male fastener component 22 includes an annular groove 48 axially spaced from the shank free end 34 axially located for engagement by the female component annulus 42 when the two components are assembled as will be hereinafter described. The male component annular groove 48 preferably has a relatively flat, radially extending side 50 at the side thereof axially toward the shank free end 34 which flat side terminates radially outwardly preferably in a relatively sharp edge 52. Furthermore, the shank free end 34 is axially slotted by a single diametrical slot 54 opening both radially of the shank and axially at the free end thereof.

To provide for resilient, snap, self-locking engagement of the female and male fastener components 20 and 22, at least one of the female component annulus 42 and the area of the male shank groove 48 must be formed of resiliently deformable material and it is preferred to form both the female and male fastener components totally of a resiliently deformable plastic, thereby adapting the same to the relatively inexpensive and precise injection molding production processes. Also, the female fastener component 20 is formed with an annular recess 56 about the shank 26 adjacent the head 24 for receiving and engaging a material sheet 58 to be fastened. The male fastener component 22 is likewise formed with a similar annular recess 60 about the shank 32 adjacent the head 30 for similarly receiving and engaging a material sheet 62 to be fastened.

Thus, with the male component shank 32 of spaced larger radial dimensions than the minimum radial dimensions of the female component annulus 42, yet with the male component shank groove 48 of minimum radial dimensions substantially equal to or less than the minimum radial dimensions of said female component annulus, the male component shank 32 may be axially inserted free endwise into the female component opening 36 from the position shown in FIG. 3 to the position shown in FIG. 4 and until the female component annulus 42 resiliently snap engages angularly radially into the male component shank groove 48 as shown in FIG. 4. With the female component annulus 42 formed of resilient material, the annulus inner end 46 may resiliently flowably snap over the male component groove edge 52 into the groove 48, and with the male fastener component 22 formed of resilient material, the male component shank 32 may resiliently flex radially inwardly as a result of the shank slot 54 while the male component groove edge 52 may resiliently flowably deform to permit said snap entrance of the female component annulus 42. After such assembly, the flat portion 44 of the female component annulus 42 will axially abut the groove flat side 50 of the male component 22 and such abutment with the axial angling of the female component annulus 44 and the groove sharp edge 52 of the male component will effectively resist attempted axial separation of the fastener components providing the permanent locking feature.

The axial dimensioning of the male component shank 32 may be such so as to provide said male component shank slightly axially recessed within the female component opening 36 after such assembly as shown in FIG. 4. Furthermore, the respective axial dimensioning of the female and male component shanks 26 and 32 may be such so as to cause the free end 28 of the female component shank 26 to axially abut the material sheet 62 of the male component 22 in such assembly, also shown in FIG. 4.

Obviously, either or both of the female and male fastener components 20 and 22 may be formed of a variety of resilient materials, either metal or plastic, and either partially or totally of said materials within the broad principles of the present invention. As previously stated, the embodiment of fastener illustrated in FIGS. 1 through 4 is preferably formed totally of a resiliently deformable plastic of any of the usual plastics depending on the use conditions of the fasteners, for instance, of plastic materials such as the acetal thermoplastic resins, or many other resiliently flowable plastics of various degrees of hardness and softness, again dependent on the service conditions involved. Such choices of materials for the particular conditions is well within the purview of those skilled in the art.

As an example, where the male component shanke 32 is formed of a more resilient material, the shank slotting can be eliminated as shown in the embodiment of male components illustrated in FIG. 5. Greater resiliency of the female component annulus 42 would also permit such male component shank slotting elimination while still providing the positive, snap, self-locking engagment and resulting virtually permanent locking.

In FIG. 6 is illustrated a still further embodiment of the male fastener component 22 formed the same as that illustrated and described in FIGS. 1 through 4, with the exception that the male component shank 32 is formed with two, crossed, diametrical axial slots 64 opening axially at the shank free end 34 and radially of said shank. This form of slotting would be used where greater radial inward deformation of the male component shank 32 is desired, either due to the male fastener component 22 being formed of a less resilient material or the female component annulus 42 being formed of a less resilient material. The virtually permanent locking of the assembly would still be provided where the assembly includes the female fastener component 20 of FIGS. 1 through 4.

An additional embodiment of the fastener of the present invention is illustrated in FIGS 7 and 8 wherein the slotting of the male component shank 32 is eliminated and the female component annulus 42 is formed with a radial slot opening radially inwardly of the female component opening 36. The female and male fastener components 20 and 22 are otherwise formed the same as described relative to FIGS. 1 through 4. This form of fastener would also be of the virtually permanent locking type and would provide for the additional resilient deformation of the female component annulus 42 during the snap, self-locking engagement of the female and male fastener components 20 and 22.

A selectively releasable embodiment of the fastener of the present invention is illustrated in FIGS. 9 and 10 in similar form of female and male fastener components 20 and 22 as illustrated and described relative to FIGS. 1 through 4. The relatively simple alterations of the female and male fastener components 20 and 22 for providing this selectively releasable feature are the provision of an arcuate or rounded inner end 68 on the female component annulus 42, and forming an arcuate groove side 70 including an arcuate or rounded groove edge 72 on the male component shank groove 48. Thus, as the male component shank 32 is inserted axially into the female component shank opening 36 from the position shown in FIG. 9 to the position shown in FIG. 10, the female component annulus 42 will snap into the male component shank groove 48, but with the assembled positioning of the arcuate inner end 68 of the female component annulus 42 abutting the arcuate groove side 70 and arcuate groove edge 72 of the male component shank groove 48. Selected resilient removal of them male component 22 from the female component 20 is thereby permitted at a later time by these cooperating acruate surfaces.

In consideration of whether the assembly of the fastener of the present invention is a permanent locking assembly or a selectively releasable assembly, it should be understood that the mere provision of an arcuate or rounded inner end on the female component annulus 42 will not necessarly provide such selective release in view of the fact that in all of the embodiments of the fastener of the present invention illustrated, effective removal of the male fastener 22 from the female fastener component 20 always tends to more completely or deeply radially engage the female component annulus with the male component shank groove 48 due to the radial angling or partial axial projection of the female fastener annulus. In other words, if a selectively releasable construction is to be provided, the axial force on the male component 22 to remove the same from the female component 20 is dependent on not only the respective shapes of the female component annulus 42 and the male component groove 48, but also the resiliency of these components in the engagement areas. Where the female and male components 20 and 22 are of minimum resilience, an excessive axial force might be required to remove the male component from the female component even though the inner end of the female component annulus 42 is arcuate or rounded so as to comprise virtually a parmanent locking construction, yet increased resilience of the male and female components might provide this same construction selectively releasable upon a reasonable axial force being applied wherein the same would be a selectively releasable construction. This matching of component resilience with annulus angling and inner end shape for the choice between a virtually permanent locking or reasonable selectively releasable construction of fastener component assembly is, however, well within the purview of one skilled in the art and can readily be determined to provide the type of final construction desired.

Furthermore, it is pointed out that although all of the embodiments of the various fastener assemblies illustrated herein show the female and male fastener components 20 and 22 generally of cylindrical shapes, it is not intended to restrict the principles of the present invention to the generally cylindrical shapes, but rather the fastener components could be formed of various other geometrical shapes such as, for instance, rectangular or hexagonal or octagonal in radial or transverse cross section. The terms "radial," "axial," and "conical" are, therefore, intended to be broadly construed in the present specification and appended claims, such terms being used as directional terms and intended to cover the equivalent directions and extensions and shapes whether the fastener components are cylindrical or circular in cross section or are other geometrical cross-sectional shapes wherein the same still properly interfit according to the principles of the present invention. Still further, the term "annulus" is intended to mean "ring-like" or "generally parametrically continuous" in the specification and claims and is not intended to be confined to a circular shaped annulus, but again is intended to include the equivalent geometrical cross-sectional shapes and extensions.

According to the present invention, therefore, various embodiments of a self-locking snap fastener are provided wherein each will have a very positively, snap, self-locking operation due to the unique cooperating configurations thereof. Furthermore, such configurations all lend the various embodiments of fastener readily adaptable to formation from a wide variety of materials and particularly from the various economically molded plastics, of great advantage in smaller sizes of the fastener. Still further, the unique fastener component configurations of the present invention permit the ready choice between virtually permanently locking fasteners or selecitvely releasable fasteners with only very slight alterations easily effected. In the permanent locking form, the fasteners are positively, snap, self-locking and positively permanent assembled, whereas in the selectively releasable forms, the fasteners are still positively, snap, self-locking, but conveniently selectively releasable.

We claim:

1. In a self-locking snap fastener, the combination of: a female fastener component having a head and an axially projecting shank terminating in a free end, an axial opening in said female component from said shank free end axially toward said head, a single radially inward tapered annulus on said female component projecting into said opening and angling axially away from said shank free end at axially opposite sides thereof, said female component annulus terminating radially inwardly in a short flat radially extending annular portion facing axially away from said shank free end of said female component; a male fastener component having a head and an axially projecting generally cylindrical shank terminating in a free end, said male component shank having an annular U-shaped cross section groove formed therein spaced axially from said free end, said male component shank being dimensioned spaced smaller radially than and axially insertable into said female component opening through said shank free end of said female component with said male component shank groove receiving a tapered extreme inner end portion of said female component annulus angularly radially engaged therein, said male component shank groove having a flat radially extending side at a side of said groove axially toward said shank free end of said male component, said shank groove flat side of said male component being adapted for flat abutting assembled engagement with said annulus short flat portion of said female component; and at least one of said female component annulus and said male component shank at said groove being formed of a resilient material resiliently deforming and returning to shape permitting said abutting assembly of said annulus flat and shank groove flat.

2. A self-locking snap fastener as defined in claim 1 in which said female fastener component is formed of resilient material with at least said female component anulus resiliently deforming and returning to shape permitting said abutting assembly of said annulus flat and shank groove flat.

3. A self-locking snap fastener as defined in claim 1 in which said female component anulus terminates inwardly dimensioned radially abutting a bottom of said male component shank groove upon said female and male component assembled egnagement.

4. A self-locking snap fastener as defined in claim 1 in which said female component annulus terminates inwardly dimensioned radially abutting a bottom of said male component shank groove upon said female and male component assembled engagement; and in which at least said female component annulus is formed of resilient material resiliently deforming and returning to shape permitting said abutting assembly of said annulus flat and shank groove flat and permitting said abutting assembly of said inner extremity of said female component annulus and said shank groove bottom of said male component.

References Cited

UNITED STATES PATENTS

| 1,744,919 | 1/1930 | Reiter | 24—216 |
| 2,062,057 | 11/1936 | Hobby | 24—216 |
| 2,367,657 | 1/1945 | Boersma | 24—213 |
| 2,610,879 | 9/1952 | Pope | 24—213 |
| 2,937,834 | 5/1960 | Orenick et al. | 24—216X |
| 3,152,376 | 10/1964 | Boser et al. | 24—216 |
| 3,210,820 | 10/1965 | Humiston | 24—208 |
| 3,301,296 | 1/1967 | Meyer | 24—217X |
| 3,416,200 | 12/1968 | Daddona, Jr. | 24—208 |

FOREIGN PATENTS

| 1,332,688 | 6/1963 | France | 24—208 |

STEPHEN J. NOVOSAD, Primary Examiner

U.S. Cl. X.R.

24—213